T. G. Green.
Moulding Earthenware
No. 108,779.   Patented Nov. 1, 1870.
4 Sheets, Sheet 2.
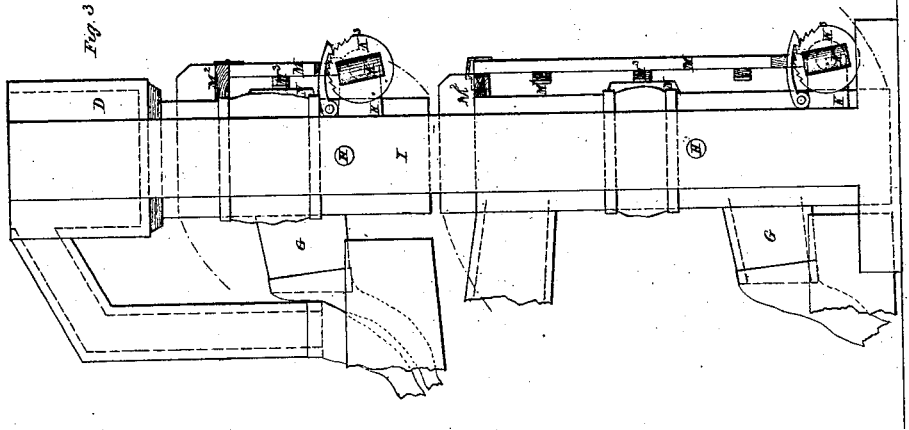
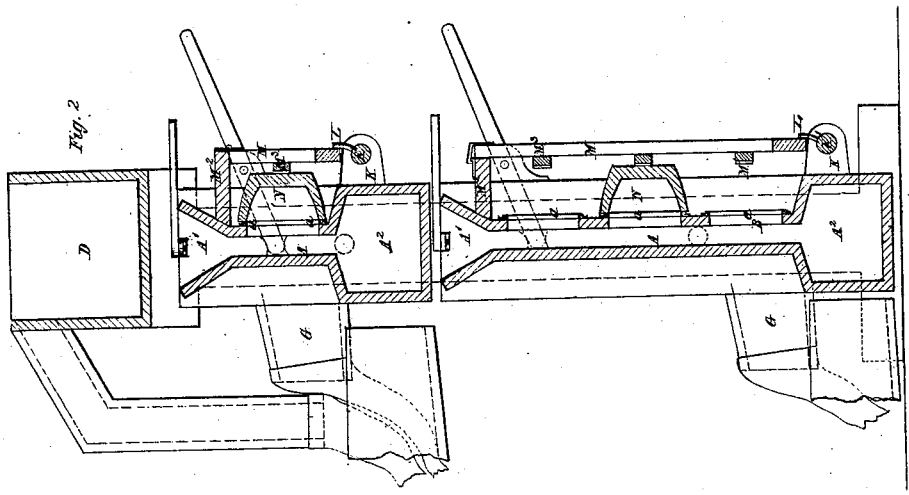

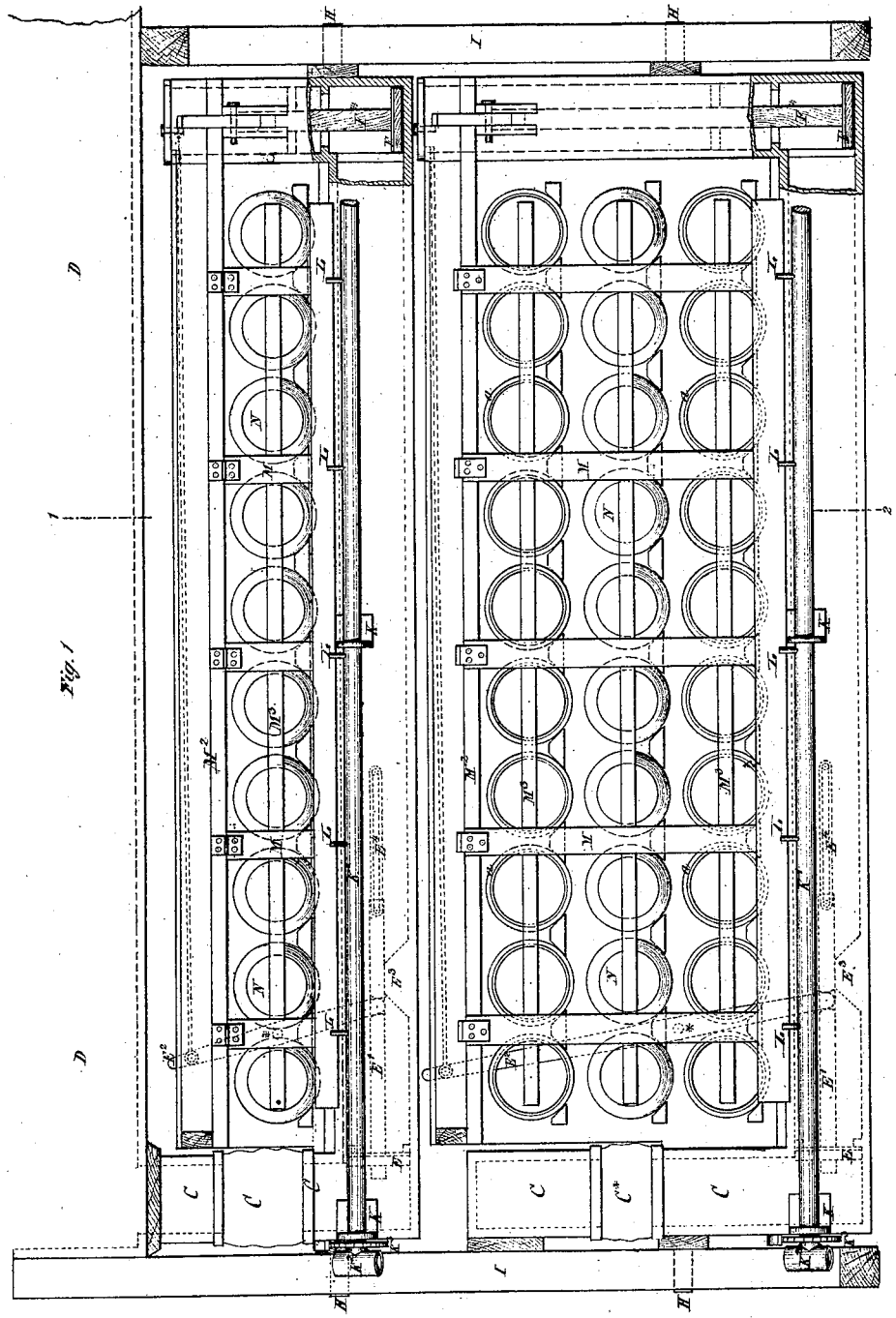

T. G. Green,
Moulding Earthenware.
No. 108,779. Patented Nov. 1, 1870.
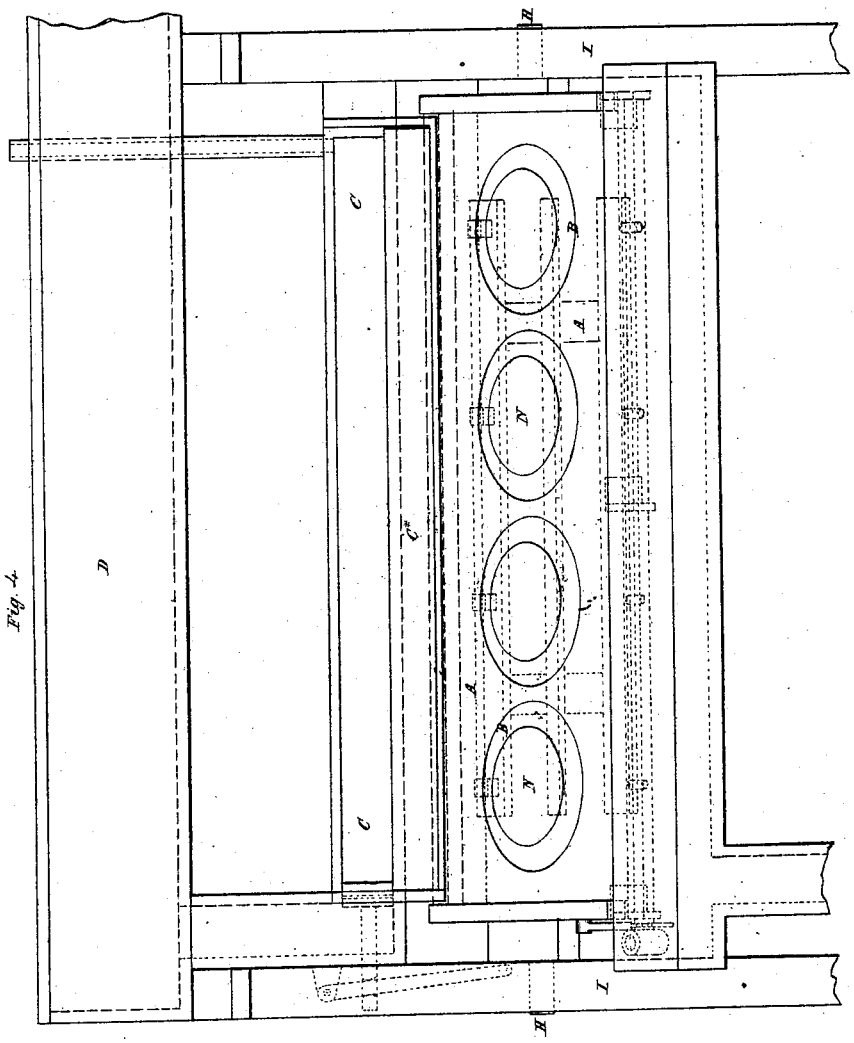
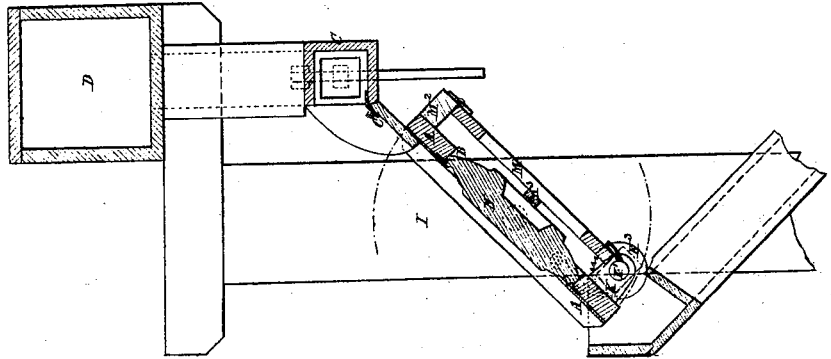

T. G. Green.,
Moulding Earthenware.
No. 108,779.   Patented Nov. 1, 1870.
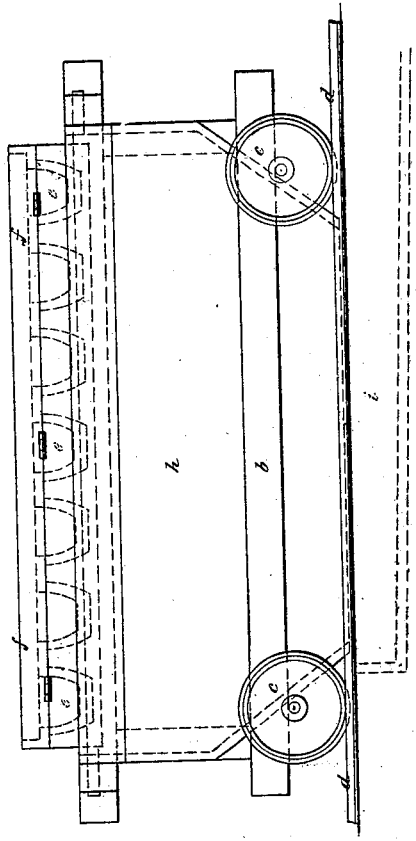
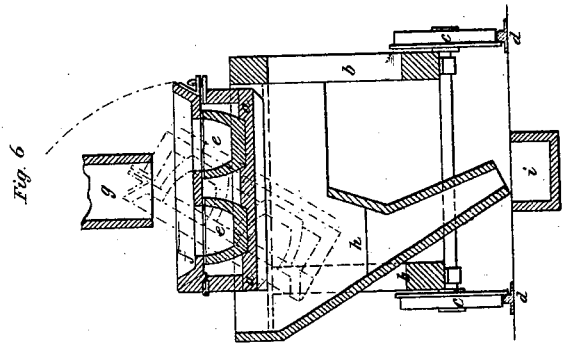

United States Patent Office.

THOMAS GOODWIN GREEN, OF CHURCH GRESLEY POTTERY, ENGLAND.

Letters Patent No. 108,779, dated November 1, 1870.

IMPROVEMENT IN MACHINES FOR MOLDING EARTHENWARE.

The Schedule referred to in these Letters Patent and making part of the same.

*To all whom it may concern:*

Be it known that I, THOMAS GOODWIN GREEN, of Church Gresley Pottery, in the county of Derby, England, have invented a new and improved Machinery or Appliances for use in the Manufacture of Earthenware and China-ware; and I do hereby declare that the following is a full, clear, and exact description of the same, reference being had to the accompanying drawing forming a part of this specification.

This invention has reference to improved machinery or appliances for use in the manufacture of earthenware, more particularly ware of that class and description the body of which is to be formed of a material of inferior or cheap quality, and covered with a coating of material of superior or more expensive character, so as to give the appearance of superior ware at less cost than heretofore.

My present invention may also be usefully employed in the processes for the manufacture of ordinary earthenware and China-ware, by the process of casting when the clay is used in a slip state or a semi-fluid state, so that it may be poured into molds.

The object of the invention is to facilitate the manufacture of cast ware by operating upon or filling several molds at a time, to which end any convenient number of molds are placed in a frame or case, and the "slip" or semi-fluid clay is poured or allowed to run into the molds, and when it has remained there long enough to allow of a deposit of clay of sufficient thickness on the surface of mold, the remainder of the slip is poured out or allowed to run out, leaving a layer of clay of the desired thickness in the mold.

This deposit when obtained is treated and finished in the ordinary manner.

For the convenience of manipulation, I have devised certain arrangements of machinery and appliances for carrying out my invention, and this machinery and appliances (modified to suit the various forms or kinds of ware to which they may be applied) form the subject of my invention.

In adapting the invention to the manufacture, say of basins or tea-cups, I make a box or case, which I call a slip-case, with a narrow internal space, say, for example, one to two inches between the front and the back thereof, and of such length and height as may be requisite to accommodate the slip-case to the sizes and the number of the molds to be used. The top of this case is to be open, and the bottom is to communicate with a duct or ducts hereafter referred to, having valve arrangements for the admission and discharge of the slip.

On the face or faces of the slip-case I cut holes corresponding to the size of the molds to be used, and I interpose a layer of some elastic material between the slip-case and the mold, so as to make a water-tight joint. Any convenient number of molds are adapted to the face of the slip-case, and are secured by a fastening or fastenings, and the slip-case is suspended upon pivots, to allow of its being tilted to any angle that may be required when the molds are to be placed in or withdrawn from the case or for the effective drainage of the slip from the molds.

This slip-case is provided with one of the ducts hereinbefore referred to, so that the slip may be conducted thereto from tanks placed at a suitable level. A part of the entrance duct is made flexible, in order to yield when the position of the case is altered by being tilted on one side.

In the accompanying drawing—

Figure 1, Sheet I, is a front elevation of my improved apparatus, consisting of the slip-case and its appliances;

Figure 2, Sheet II, is a transverse vertical section of the same, taken in the line 1 2 of fig. 1; and Figure 3, Sheet II, is an end elevation.

The sides, bottom and ends of the slip-case are marked A.

The upper part, which is marked $A^1$, fig. 2, being funnel-shaped, and serving as what I term a "spare," having sufficient capacity to allow enough slip to rise therein for the purpose of keeping up the supply as the level of the slip is reduced by the absorption of the molds.

The lower part of the slip-case, marked $A^2$ in fig. 2, is enlarged, as shown in said fig. 2.

B denotes openings in one side of the slip-case, against which the faces of the molds N to be filled, are placed.

C denotes the duct from the slip-tank D.

This duct C consists of three parts, namely, the lower, which forms a part of the slip-case, (as shown,) the middle portion, C*, formed by an India-rubber or elastic tube, fitted onto the lower part, and also to the upper part, such upper part of the duct being fixed to or forming a part of the tank D.

E is a valve, shown by dots in fig. 1, for the admission of slip from the lower part of the duct C into the body of the slip-case.

$E^1$ is the valve-rod, and $E^2$, a lever, jointed to the valve-rod, which is carried up beyond the top of the slip-case, and works on the lever-center *, placed across the interior of the slip-case, and is supported by the sides thereof.

$E^3$ is a supporting or guide-block for the valve-rod $E^1$ to work on, and $E^4$ is an India-rubber spring for keeping the valve closed.

The lever $E^2$ is actuated by means of a wire or rod secured to the top thereof, and passing to a horizontal lever situate near the discharge-end of the slip-case, and working in a horizontal line on the top of the same.

F is a valve to the duct G, for the discharge of the slip.

F* is the upright-valve rod of the discharge-valve F, which may be worked by chain and pulleys or lever, connected to the rod, as shown in the drawing.

H H are pivots, on which the slip-case can be moved or tilted for more conveniently placing and removing the molds, and so forth.

I I are supporting-posts for the slip-tank, and in which the bearings for the pivots of the slip-case or mold-racks are situated.

K K, fig. 2, are brackets, secured to and projecting from the front side of the slip-case, and carrying a piece of iron tubing, $K^1$, on which the catches L are fixed.

This tube with its catches is capable of being rotated on its axis for the purpose of locking the frame or gate M, which holds the molds N in place, and is hinged to the bar $M^2$, fixed to the front of the slip-case.

To the gate or framing M is attached a horizontal rail, $M^3$, the front of which is provided with thick blocks of India rubber, which bear against the backs of the molds, and act as an adjustable packing between the molds and the framing M.

The joints between the faces of the molds N and the face of the slip-case round the openings B, are made water-tight by means of rings of rubber, $a$, so that the slip from the case is prevented from running out at the joints, which are, moreover, kept tight by the frame or gate M, with its rail and rubber blocks $M^1$ pressing the molds forward against the slip-case.

The framing M is pressed forward for this purpose by means of a lever inserted into a socket, $K^2$, at one or both ends of the locking-tube $K^1$, and this latter, with its catches L, are held in position by pawls taking into the ratchet-racks $K^3$.

The slip-case, with a single row of molds shown at the upper part of figs. 1, 2, and 3, is for putting on the fine external coating of slip; but the slip-case immediately below it, with the three rows of molds, is for putting on the thick body of the article, and which body is formed of a commoner material.

As a considerable thickness of this material is required, the slip must remain on the molds a longer time than for the external coat. I, therefore, employ two or more rows of molds, which are filled and emptied in precisely the same manner as the upper slip-case.

The frame M for the lower slip-case is not hinged to the bar $M^2$, as is the case with the upper frame, but is simply suspended therefrom by hooks, as shown at fig. 2, to admit of removal with facility.

The action of the apparatus is as follows:

Upon the valve E for the admission of the slip being opened, the slip will rise up the inside of the slip-case and fill the molds. When the slip-case has been filled to the height required, the admission-valve E should be closed, and the slip allowed to remain in the case sufficient time to deposit the required thickness of clay upon the surface of the molds. Then the discharge-valve F may be opened and the slip allowed to discharge itself, leaving the molds with a thin lining of slip on their surfaces. The molds are then to be removed, and placed in the lower slip-case, in which they receive the commoner material to make the body of the article. When this has been done, the molds are removed from the lower slip-case, and, after being allowed to stand a short time to solidify the clay, they are placed in the upper case to receive the inner coating of fine slip.

If the articles are to be made solid, that is, of the same material throughout, the molds are allowed to remain in the slip-case until a sufficient thickness has been deposited. The superfluous slip is then drawn off in the manner already explained, and the molds may then be removed and placed in the drying-stove, after which the ware may be fettled and finished in the ordinary way.

From the above description of my improved machinery and appliances, it will be evident that the invention is equally applicable to the manufacture of ordinary cast-ware as to the improved ware already referred to.

A machine or appliance which may be used for the internal or external facing of flat ware, such as plates or dishes, is shown in Sheet III of the drawings, in which—

Figure 4 is a front elevation, and

Figure 5, a vertical section of the machine.

It consists of a mold-rack, A, constructed on the principle of one side of the slip-case already described.

The rack or frame A, in which the molds N are secured, has holes or openings, B, made in it, (corresponding to the molds,) as in the former instance.

This mold-rack or frame A is mounted upon an axis or pivot, on which it may be turned, as indicated by the dotted lines in fig. 5, and it may be fixed at any angle that may be required.

In connection therewith, I construct a slip-duct, C, of the capacity required, according to the size and number of the articles to be made.

One side of this duct is made to open on a hinge, as at C*, so that it may fall down and rest on the rack; but, when the duct is full of slip, the movable side must be secured by suitable fastenings, to prevent the liquid from leaking out.

In operating with this apparatus, I place the molds N in the rack A, and then fix the rack at the angle required, and, after filling the trough C with slip, (such trough being fixed in a position to allow of the hinged side C* of the trough falling upon the top edge of the mold-rack A,) I open the hinged side C*, and allow it to drop upon the top edge of the mold-rack, which will allow the amount of slip the trough or duct C contained to flow over the faces of the molds in the rack, leaving a smooth and perfect covering, and completing the covering of as many molds as the rack may contain.

The bar $M^3$, with its rubber block and other accessories, is used in the same manner and for the same purpose as that explained in reference to the figures in Sheet I.

If the main body of the ware is to be made of the inferior material, this may be done by the aid of the slip-case hereinbefore described, after which the surface of the main body should be properly smoothed down by the workman, who can put the foot on the ware, if required. The last coat may then be applied by means of the mold-rack, in the manner just described for the first thin coat.

The machinery and appliances I have described are those which I have used with advantage, and prefer to use, for the manufacture of a great variety of articles; but for some articles a modification of the apparatus shown may be used. For instance, the molds may be placed in a rack-frame or case, $a\ a$, as shown in Figures 6 and 7, Sheet IV, which is mounted on centers or pivots, so that it may be turned thereon or tilted, when required, as shown by dots in fig. 6.

This rack-frame may, if desired, be adapted to a carriage, $b$, and mounted on wheels $c$, so that it may be moved to and fro on rails $d$, or otherwise.

Any convenient number of molds $e$, according to the size of the articles to be produced, are placed in the rack or case $a$; and on the face of the molds is placed a tray, $f$, provided with a flange or projecting edges all around, and in which are made openings corresponding to the openings of the molds $e$, precisely as shown at figs. 2 and 5.

This tray is pressed down on the faces of the mold, and water-tight joints (formed by rings of rubber, in the manner already explained,) are produced.

When the molds have been properly secured in the rack or case $a$, the latter may be run up (on its wheels) to the slip-trough $g$, and the requisite quantity of slip allowed to run onto the tray $f$, and from thence into the molds.

When the molds and tray are filled, the rack may be run back, and allowed to remain until a sufficient thickness of solid matter has been deposited on the surface of the molds. The rack may then be tilted on one side, as indicated by dots, fig. 6, in order to discharge the superfluous slip into the funnel $h$, and from thence into a channel, $i$, leading to a tank. The articles cast in the molds may then be treated and finished in the ordinary manner.

The discharged slip, in all these cases, is allowed to run into a tank, from which it is pumped up into the reservoirs connected with the slip-cases or troughs.

Having thus described my invention,

I claim as new and desire to secure by Letters Patent—

1. The receptacle and charger A, constructed as set forth, and provided with openings B, as and for the purpose herein shown and described.

2. The charger A, provided with hinged rack M, with its elastic keeper-blocks, and the securing device $K^1 K^3 L$, when constructed and operating substantially as and for the purpose set forth.

3. The combination of pivoted charger A, tank D, and flexible duct C*, as and for the purpose shown and described.

In witness whereof, I, the said THOMAS GOODWIN GREEN, have hereunto set my hand the 19th day of August, in the year of our Lord 1870.

THOS. G. GREEN.

Witnesses:
   H. K. WHITE,
      66 *Chancery Lane.*
   W. I. WYNN,
      24 *Royal Exchange, London.*